(Model.)

J. E. EMERSON.
Crosscut Saw.

No. 239,156. Patented March 22, 1881.

Attest:
F. H. Schott
A. R. Brown.

Inventor:
James E. Emerson
By Newton Cranford
atty

UNITED STATES PATENT OFFICE.

JAMES E. EMERSON, OF BEAVER FALLS, PENNSYLVANIA.

CROSSCUT-SAW.

SPECIFICATION forming part of Letters Patent No. 239,156, dated March 22, 1881.

Application filed January 26, 1881. (Model.)

*To all whom it may concern:*

Be it known that I, JAMES E. EMERSON, a citizen of the United States, residing at Beaver Falls, in the county of Beaver and State of Pennsylvania, have invented certain new and useful Improvements in Crosscut-Saws; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of my invention is to provide a fast and smooth cutting, easy-operated saw, and at the same time a saw that will wear a long time without gumming; and it consists in the combination and arrangement of the different kinds of cutting or scoring teeth and clearing-teeth in sections, and the interposed graduated slots or dust-spaces between the sections, as will be fully hereinafter described.

Figure 1:
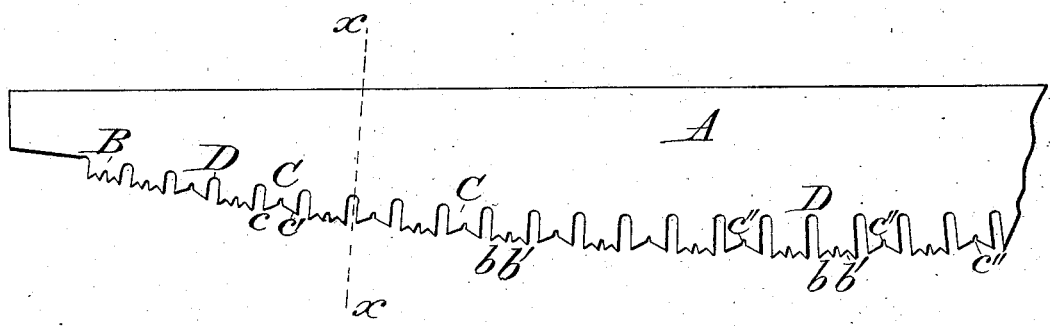
Figure 2:
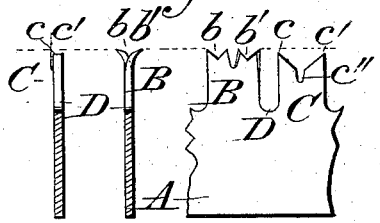

In the drawings, Figure 1 represents a broken view of the side of the saw, and Fig. 2 an enlarged and transverse sectional view.

A represents the saw-blade, the cutting-edge of which is divided into sections B and C by the deep slots or dust-spaces D, which dust-spaces are of sufficient depth at each end of the saw-blade to more than contain and carry the dust collected therein in operating the saw, and they gradually increase in depth as they approach the center of the blade, where they are double, or more than double, the depth they are at either end, which construction of gradually increasing the depth of the dust-spaces toward the middle or belly of the saw avoids the necessity of gumming for a much longer time than when the dust-spaces are all the same depth as at the ends, because the wear of the saw in the middle of its length is double that at the ends.

Sections B have two pairs each of cutting or scoring teeth. The pair marked $b$ is set to the same side of the saw-blade, and the pair marked $b'$ is set to the opposite side of the blade. These scoring-teeth are small, projecting but a small distance from their bases, and set in pairs, so that one pair have their cutting-points at the same side of the blade, and the other pair, set to the opposite side, will keep the saw from chattering in or ribbing the walls of the kerf. Hence the reciprocations of the saw will be free, and the scoring-teeth will continuously act upon the fiber of the wood as the saw is reciprocated.

Interposed between sections B are sections C, which have two clearing-teeth, $c$ and $c'$, one on one side and the other on the opposite side of the sections, and form what are known as "M-shaped teeth," with a shallow slot, $c''$, between the approaching angles of the inclined outer edges of teeth $c$ and $c'$. These clearing-teeth $c$ and $c'$ are dressed at right angles with the saw-blade, and are as much, or about as much, shorter in their projection as the scoring-teeth are intended to cut into the wood, are without any set, and thereby clear the kerf of all the wood the fiber of which is scored or cut off at the walls of the kerf by the sets of scoring-teeth that precede the clearing-teeth in that reciprocation, or a reciprocation in one direction. The slot $c''$ between the clearing-teeth on sections C facilitates the operation of dressing the inclined outer edges of the clearing-teeth $c$ and $c'$, and saves the angle of the file from wear when used to dress the outer inclined part of the clearing-teeth.

A saw constructed with the center of its length much wider than its ends, and having the graduated slots or dust-spaces, the scoring and clearing teeth arranged with relation to each other as shown, is an improvement over saws in common use in the ease of operation and perfection of its work, and is not liable to get out of order or repair with ordinary care in its use.

I am aware that graduated dust-spaces between the teeth of crosscut-saws are not new, and I do not claim them, broadly; but What I do claim is—

The combination, in a crosscut-saw, of the sections B, having scoring-teeth $b$ and $b'$ in pairs, one pair, $b$, set to one side of the blade, and the other pair, $b'$, set to the opposite side, and the sections C, having clearing-teeth $c$ and $c'$, with the graduated slots or spaces D, constructed and arranged as and for the purposes described.

JAMES E. EMERSON.

Witnesses:
J. MASON GOSZLER,
JNO. W. SOMES.